March 17, 1970  G. J. EICHORN  3,501,140
COMBINED COLLAPSIBLE PHYSICAL FITNESS APPARATUS INCLUDING
A HORIZONTAL BAR AND OTHER EXERCISING DEVICES
Filed Jan. 2, 1968  4 Sheets-Sheet 1
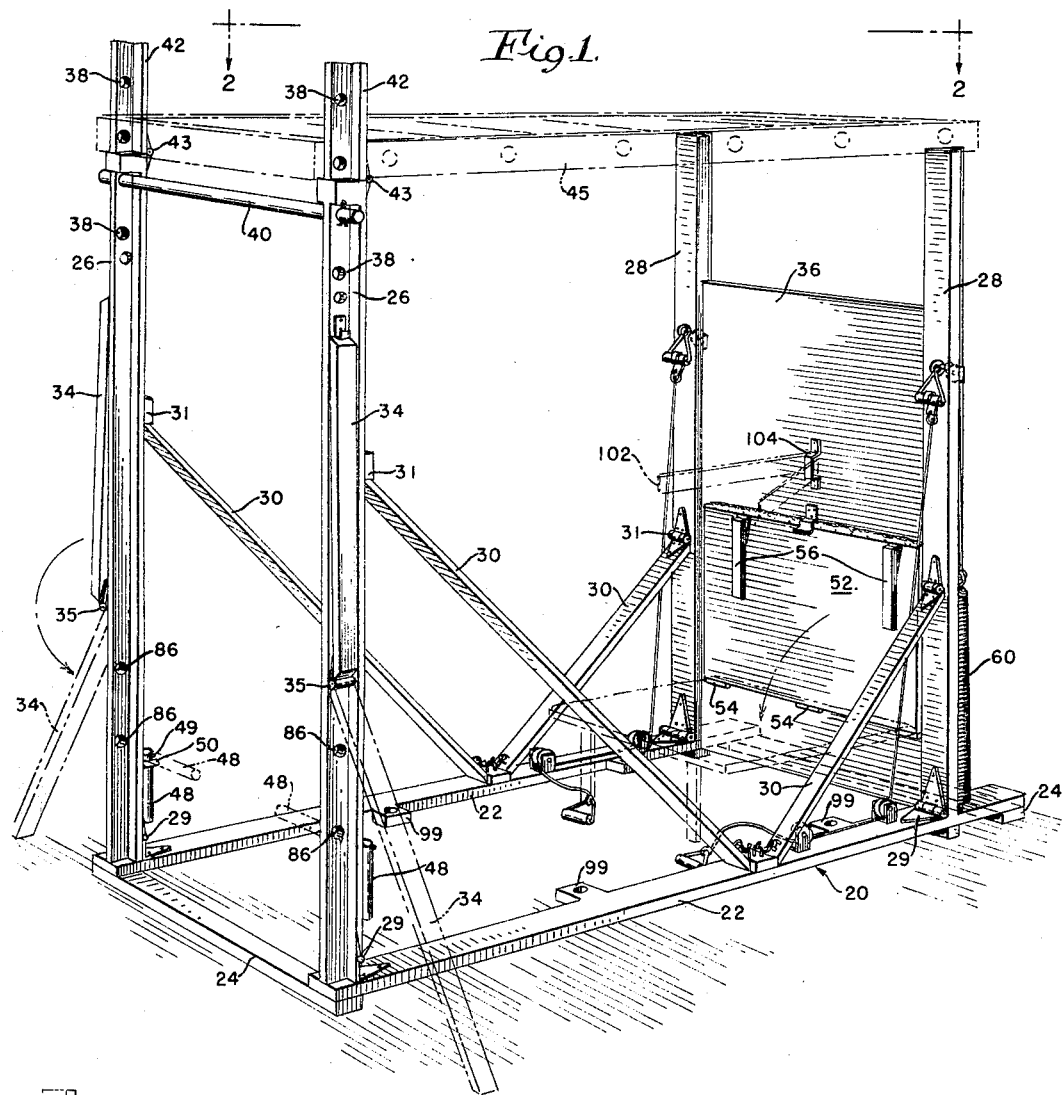
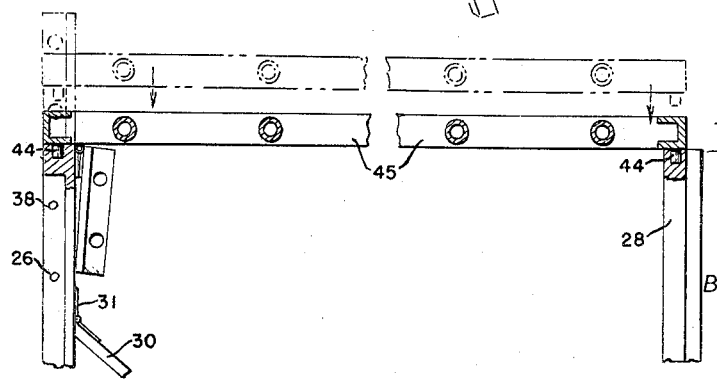
INVENTOR.
GEORGE J. EICHORN
BY
*Bean & Bean*
ATTORNEYS

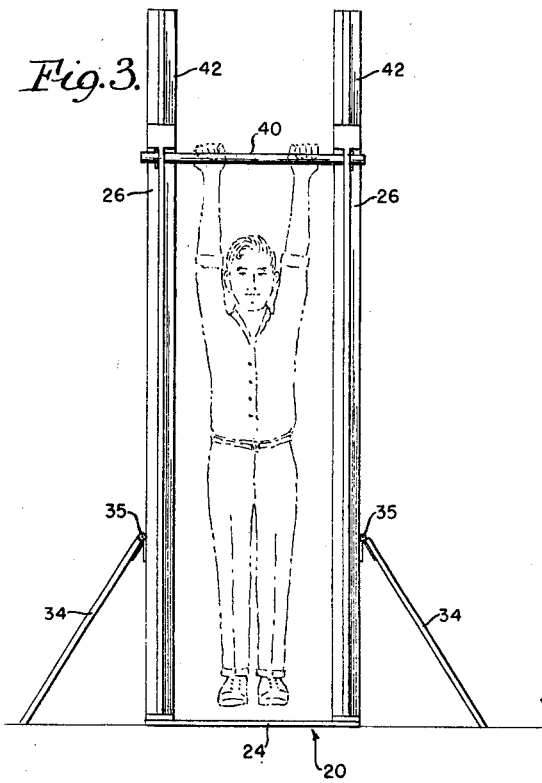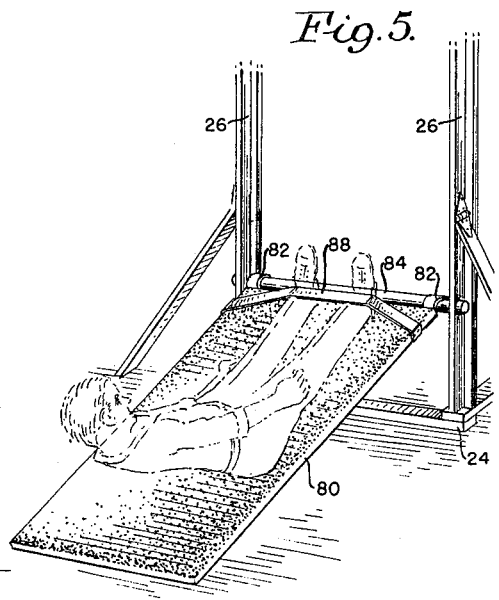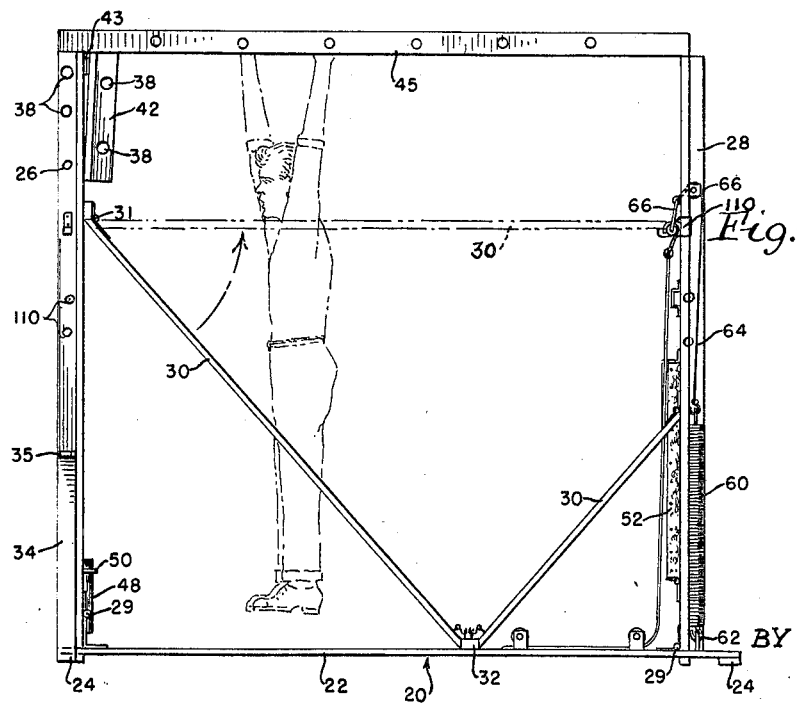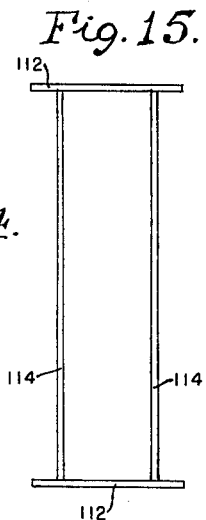
INVENTOR.
GEORGE J. EICHORN
BY
Bean & Bean
ATTORNEYS INVENTOR.
GEORGE J. EICHORN
BY
Bean & Bean
ATTORNEYS March 17, 1970  G. J. EICHORN  3,501,140
COMBINED COLLAPSIBLE PHYSICAL FITNESS APPARATUS INCLUDING
A HORIZONTAL BAR AND OTHER EXERCISING DEVICES
Filed Jan. 2, 1968  4 Sheets-Sheet 4
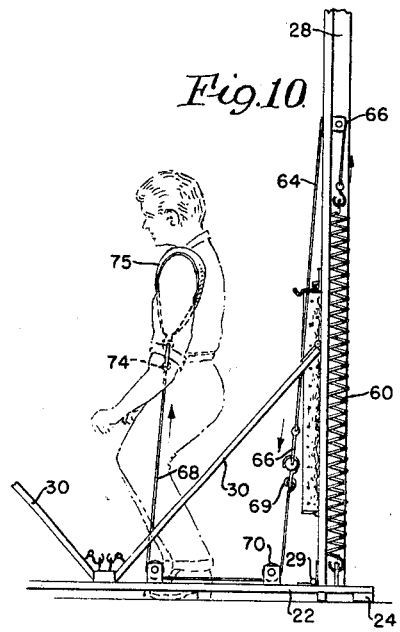
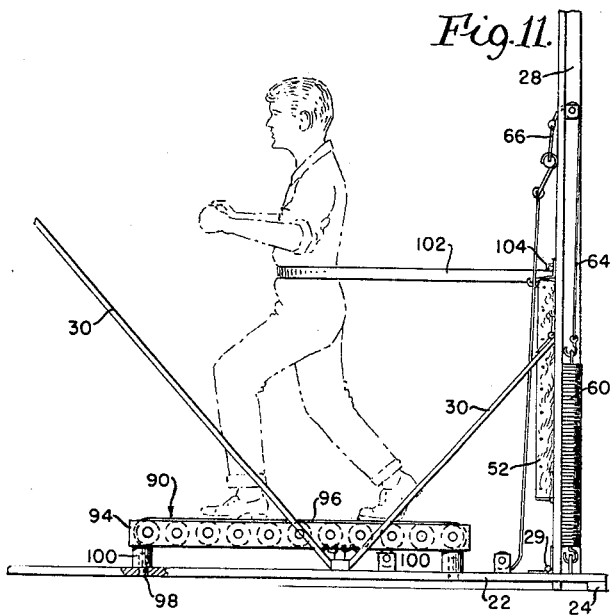
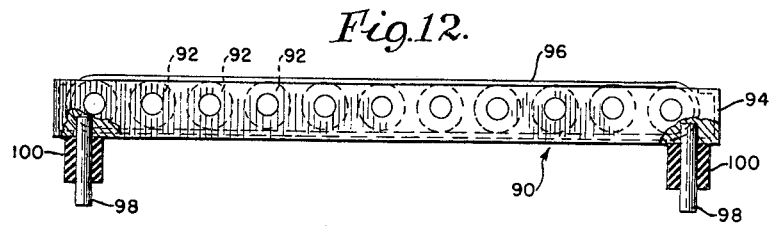
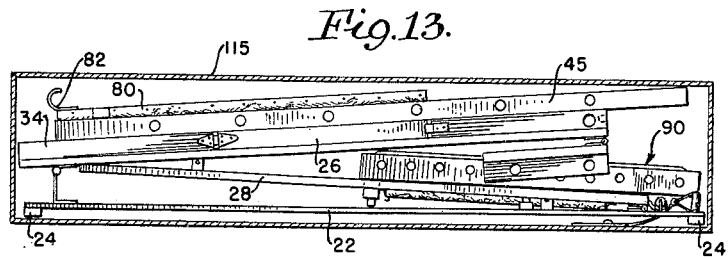
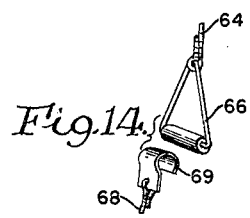
INVENTOR.
GEORGE J. EICHORN
BY
Bean & Bean
ATTORNEYS United States Patent Office 3,501,140
Patented Mar. 17, 1970

3,501,140
COMBINED COLLAPSIBLE PHYSICAL FITNESS
APPARATUS INCLUDING A HORIZONTAL
BAR AND OTHER EXERCISING DEVICES
George J. Eichorn, 162 Crystal Ave.,
Buffalo, N.Y. 14240
Filed Jan. 2, 1968, Ser. No. 694,931
Int. Cl. A63b 23/06, 21/02
U.S. Cl. 272—58                                                            8 Claims

ABSTRACT OF THE DISCLOSURE

An exercising apparatus for home or gymnasium use or the like in performing body-building exercises; featuring in combination form, a compactly collapsible support structure and certain appurtenances thereto, providing an improved versatility with respect to use of the apparatus and transport and storage thereof. The included exercising apparatuses are a "horizontal ladder," handlebar members for usage in connection with push-up exercises, a reclined plate for use with "sit-up" exercises, cable members and springs attached thereto for "weight-pulling" exercises and a treadmill.

In the drawings:

As shown by way of example in the drawing herewith:

FIG. 1 is a side perspective view of an apparatus embodying the features of the invention;

FIG. 2 is a fragmentary sectional view as suggested by line 2—2 of FIG. 1;

FIG. 3 is a front elevational view of the apparatus in one mode of use;

FIGS. 4, 5, 6, are views showing the apparatus in other modes of use;

Figure 8:
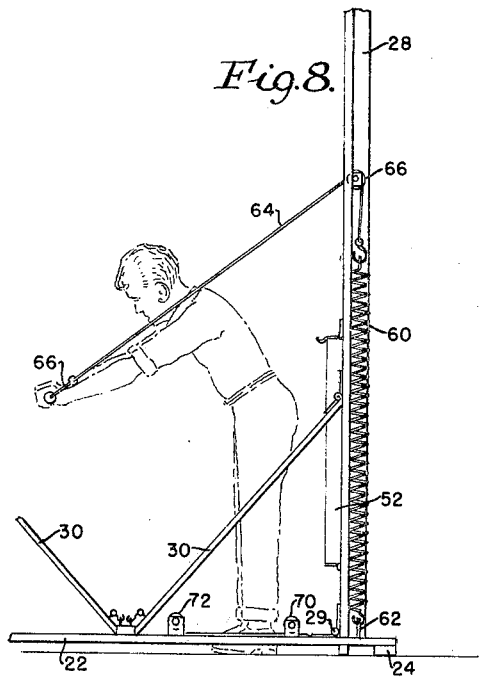
Figure 9:
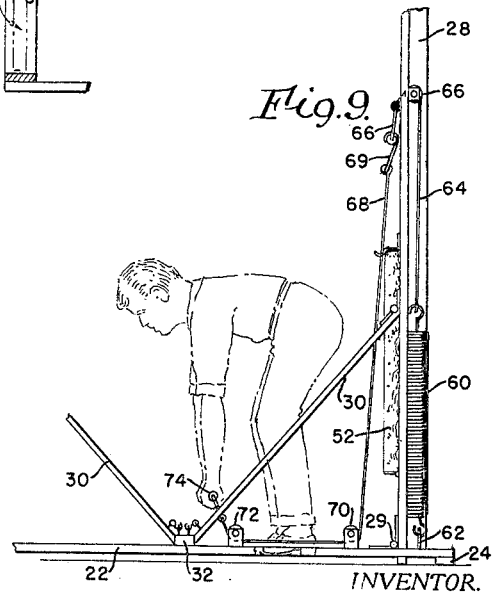

FIGS. 8, 9, 10, correspond to FIG. 4 but show further alternatives of use of the apparatus;

FIG. 11 illustrates the use thereof as a walking-running exercising device;

FIG. 12 is an enlarged scale view of the "treadmill" mechanism shown in FIG. 11;

FIG. 13 is a vertical sectional view through a carrying case into which the essential components of the apparatus of the present invention have been compacted;

FIG. 14 is a perspective detail of an exercise appliance connection device as employed for example in FIGS. 9, 10, 11; and FIG. 15 is a reduced scale disassembled plan view of a "horizontal bar" component of the apparatus of the invention.

As shown herein, the apparatus of the present invention comprises essentially a "knock-down" or collapsible type support structure including a base element 20 which comprises longitudinal and transverse sill members 22—22, 24—24, respectively. The support structure also includes corner post members 26—26 at the front end of the structure, and corner post members 28—28 at the rear end thereof. These posts are hingedly connected at their bottom ends to the base element as indicated at 29. Diagonal braces 30 are hingedly connected as shown at 31 at their upper ends to the post members, and are detachably connected at their bottom ends as indicated at 32 to the bottom sills. Also, lateral braces 34 (FIGS. 1, 3, 4) are hingedly connected at 35 to the front post members so as to be foldable flatwise against the posts (for storage purposes) and are extendible laterally therefrom as shown in FIG. 3 to brace the structure in sidewise directions. The rear posts 28—28 are laterally braced by means of a back board 36 as best shown in FIG. 1. It will be understood that the support structure hereinabove described may be fabricated of any preferred materials such as wood, metal, etc.; and that the hinge and detachable connection hardware devices may be of any preferred types and construction.

The chin bar

As best shown in FIGS. 1, 3, the front posts 26—26 are provided with vertically aligned bore holes as indicated at 38 to permit a chin bar 40 to be slip-fitted into operative position at any preferred elevation thereon. In addition, extension pieces 42—42 are hingedly connected to the upper ends of the posts and are thus swingable upwardly into operative position as shown in FIG. 3 so as to provide means for mounting the bar 40 at any preferred still further elevated position.

The horizontal ladder

As best shown at FIGS. 1, 2, 4, the upper ends of the posts 26—26, 28—28, are socketed so as to receive in slip-fitted relation thereon pins 44 extending from the four corner portions of a ladder 45 when mounted horizontally thereon. Thus, the ladder is firmly anchored on the structure for "arm walking" type exercise purposes, as illustrated at FIG. 4.

Push-ups

Figure 6:
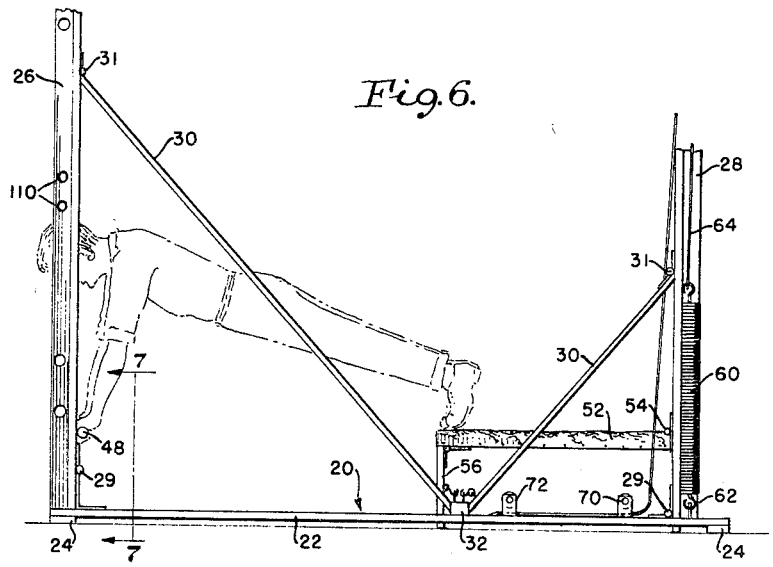
Figure 7:
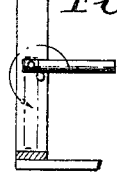
FIG. 7 is a fragmentary section taken on line 7—7 of FIG. 6.

The front posts 26—26 carry at their lower ends a pair of handle bars 48—48 by means of pivot pins 49—49, and are arranged to be held by step pins 50 in horizontally extending positions as shown in FIG. 6 and by means of broken lines in FIG. 1. Thus, the user may grip the handle bars 48—48 as shown in FIG. 6, and extend his body horizontally to the rear thereof, to practice the well known "push-up" type exercises. To further facilitate this exercise a table device as shown at 52 is preferably hinged as indicated at 54 to the back board 36 and provided with fold-down legs 56—56 so as to stand horizontally, whereby the user may anchor his feet upon the table 52 while performing the "push-up" exercises as shown in FIG. 6.

Weight pulls

For "weight-pull" type exercise purposes a pair of tension springs 60—60 are provided to stand vertically adjacent each rear post 28—28. These springs are anchored at their lower ends by means of hooks 62 to the bottom sills 22 and are hooked into connections at their upper ends to pull cables 64—64 which train around pulleys 66—66 mounted on upper portions of the posts 28—28. The cables 64 terminate in roller type hand grip devices 66 as best shown in FIG. 14 whereby the user may, while standing erect as shown in FIG. 8, utilize the apparatus to perform the well known "weight-pull" type exercises. A pair of extension cables as illustrated at 68—68 having hook end portions 69 are provided for detachable connections to the grip devices 66—66 as shown in FIGS. 9, 10. The cables 68—68 train downwardly under guide pulleys 70–72 and terminate in roller type hand grip portions 74—74. Hence, the apparatus is readily adapted for use in connection with the so-called "lean-over weight-lift" type exercises. Furthermore, by attachment of shoulder harness devices 75 to the grip portions 74 as shown in FIG. 10, the apparatus is thereby readily adapted for use as a "deep knee bend" type weight lift exerciser.

Sit-ups

For the performance of "sit-up" exercises the apparatus includes a base plate as indicated generally at 80 (FIG. 5) which may either be employed flatwise on the floor, or hooked by means of C clamps 82—82 upon a bar 84 slip-fitted through registering apertures 86—86 formed in the posts 26—26 (FIGS. 1, 5). Thus, one end of the plate 80 may be hung at any desired elevation on the support structure so as to dispose the plate at a preferred inclination as shown in FIG. 5. A hold-down strap is provided as shown at 88 whereby the user may slip-fit his feet thereunder so as to obtain the required "purchase" to enable him to perform the desired "sit-up" exercises.

The jogging-walking-running treadmill

As indicated generally at 90 (FIGS. 11, 12) a running treadmill is provided for detachable mounting on the sill members 22—22 to enable the user to perform jogging or walking or running exercises as illustrated at FIG. 11. The treadmill may be of any suitable type but as shown herein by way of example it comprises a series of parallel rollers 92 carried in a rectangular frame 94 and enclosed by an endless tread belt 96. The mill is detachably mounted on the sill members 22—22 by means of pins 98 extending from the frame member 24 and slip-fitted into apertured portions 99 of the sills 22—22. Resilient bushings formed of rubber or the like as indicated at 100 are interposed between the mill frame and the floor sills to provide a cushioned support effect. To facilitate the use of the apparatus a belt strap as indicated at 102 (FIG. 11) is detachably connected as indicated at 104 (FIGS. 1, 11) to the back board 36; whereby the user will be restrained to remain at all times in proper position on the mill when jogging, walking, or running.

Parallel bars

The posts 26—26, 28—28 are apertured as indicated at 110 to receive in slip-fitted relation therethrough (at any preferred elevation) the opposite ends of a pair of crossbar members 112—112 (FIG. 15) which support in turn a pair of rails 114—114. Thus the rails 114—114 provide the typical "horizontal bar" arrangement for the performance of such exercises thereon. The rails 114—114 may either be permanently fixed to the crossbars 112—112 as by welding, or may be arranged for detachable connections thereto, as preferred. Alternatively, the front post brace members 30—30 may be disconnected at their bottom ends and swung upwardly about their hinge mountings 31—31 as indicated diagrammatically to the broken line positions thereof as shown in FIG. 4, whereupon they may be temporarily locked at their free ends to the rear posts 28—28 as by means of latch devices 110; whereupon the members 30—30 will be disposed so as to provide a suitable "horizontal bar" arrangement for performance of exercises thereon. It will be appreciated that the rear brace members 30—30 will at the same time provide the requisite fore-and-aft bracing for the frame structure, while the brace members 34—34 provide the requisite lateral bracing thereof.

By virtue of the design of the essential support structure and appurtenance parts of the invention as illustrated and described hereinabove, the entire apparatus may be readily disconnected and folded into compactly nested form as illustrated at FIG. 13, for storage and/or transport within a rectangular carrying case such as indicated at 115. It is of course to be understood that although only one form of apparatus embodying the features of the invention has been illustrated by way of example and described hereinabove, various changes may be made therein without departing from the spirit of the invention or the scope of the following claims.

I claim:

1. A physical exercise apparatus comprising in combination, a collapsible and inter-foldable frame structure including a rectangular shaped base member, post members individually arranged to stand vertically from each plan view corner portion thereof and hingedly connected at their bottom ends to said base member and thereby defining paired front and rear post members when standing erect relative to said base member, first diagonal brace members hingedly connected to each of said rear post members and arranged to extend forwardly and downwardly therefrom into detachable locking engagements with said base member thereby stabilizing said rear post members when in upright standing positions, second diagonal base members hingedly connected to each of said front post members to extend rearwardly and downwardly therefrom into detachable locking relation with said base member for bracing said front post members in fore and aft directions, said second brace members being dimensioned so as to be swingable upwardly into horizontal attitudes and then detachably locked at their free ends to said rear post members thereby providing "horizontal bar" exercise facilities for the user while said first brace members operate to stiffen the assembly in fore-and-aft directions, and paired lateral brace members hingedly connected to each of said front post members and adapted to be disposed to incline downwardly and outwardly therefrom into pressure-bearing relation with the adjacent floor surface so as to laterally stiffen the frame structure, a "chinning exercise" bar, the upper ends of said front post members being provided with means for engaging said chinning bar in mounted relation thereon at selected elevations thereon and with said bar extending transversely therebetween, bar; all of said brace members being so dimensioned and mounted and arranged as to be foldable into "collapsible" form when unlocked, into cooperating nested relation with said base and said post members when the latter are folded downwardly into parallel relation therewith.

2. A physical exercise apparatus as set forth in claim 1 wherein the upper ends of said post members are also provided with means for detachably mounting thereon the four-corner portions of a "horizontal ladder" type exercise device.

3. A physical exercise apparatus as set forth in claim 1 wherein said rear post members support means for mounting a hingedly connected foot platform, and said front post members support horizontally extensible-retractable handlebar members at an elevation commensurate with that of said foot platform, for cooperative usage in connection with "push-up" exercises.

4. A physical exercise apparatus as set forth in claim 1 wherein said front post members are provided adjacent their lower ends with means for supporting a base plate upon which the user may recline while performing "sit-up" exercises.

5. A physical exercise apparatus as set forth in claim 1 wherein a pair of first cable sheaves are mounted on said rear post members, and a cable member trains around each said sheave and is connected at one of its ends to a movable resistance to motion device and at its other end is connected to a hand grip device, said resistance to motion device being anchored on said base member and said hand grip device being disposed within convenient reach of the user for performance of "weight-pulling" exercises.

6. A physical exercise apparatus as set forth in claim 5 wherein said base member mounts a pair of second cable sheaves at opposite sides thereof and wherein supplemental cable devices are provided to train around said second sheaves, said supplemental cable devices each having at one end hook means for detachable engagement with the hand grip device of the corresponding first cable member and terminating at its other end in a body grip device.

7. A physical exercise apparatus as set forth in claim 6 wherein said body grip devices comprise shoulder strap means.

8. A physical exercise apparatus as set forth in claim 1 wherein said base member is provided with a treadmill upon which the user may perform jogging or walking or running exercises, and wherein a forward motion restraining belt is anchored relative to said rear post members, said belt device being so dimensioned and arranged that when the user embraces himself within said belt he is disposed in proper position to perform jogging or walking or running exercises while being restrained by said belt to maintain a proper position on said treadmill.

References Cited

UNITED STATES PATENTS

| 1,744,594 | 1/1930 | Trzesniewski | 272—60 |
| 1,779,903 | 10/1930 | Daragon | 272—60 |
| 2,855,200 | 10/1958 | Blickman | 272—63 |

RICHARD C. PINKHAM, Primary Examiner

R. W. DIAZ, JR., Assistant Examiner

U.S. Cl. X.R.

272—60, 62, 69, 83